(12) United States Patent
Ziegler et al.

(10) Patent No.: US 11,370,209 B2
(45) Date of Patent: Jun. 28, 2022

(54) METHOD OF PRODUCING A VENEERED ELEMENT

(71) Applicant: Välinge Innovation AB, Viken (SE)

(72) Inventors: Göran Ziegler, Viken (SE); Per Nygren, Ramlösa (SE); Thomas Meijer, Älmhult (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 17/205,469

(22) Filed: Mar. 18, 2021

(65) Prior Publication Data

US 2021/0277670 A1   Sep. 9, 2021

Related U.S. Application Data

(63) Continuation of application No. 14/593,458, filed on Jan. 9, 2015, now Pat. No. 10,988,941.

(30) Foreign Application Priority Data

Jan. 10, 2014 (SE) .................................... 1450023-5
May 12, 2014 (SE) .................................... 1450552-3
Sep. 29, 2014 (SE) .................................... 1451154-7

(51) Int. Cl.
*B44C 5/04*      (2006.01)
*B32B 37/10*     (2006.01)
(Continued)

(52) U.S. Cl.
CPC ............... *B32B 37/10* (2013.01); *B27G 1/00* (2013.01); *B27N 3/02* (2013.01); *B27N 3/04* (2013.01); *B27N 7/005* (2013.01); *B32B 3/30* (2013.01); *B32B 5/142* (2013.01); *B32B 21/02* (2013.01); *B32B 21/08* (2013.01); *B32B 21/14* (2013.01);
(Continued)

(58) Field of Classification Search
CPC .................... B29C 66/30325; B29C 66/02245
See application file for complete search history.

(56) References Cited

U.S. PATENT DOCUMENTS 2,018,712 A   10/1935   Elmendorf
2,419,614 A    4/1947   Welch
(Continued)

FOREIGN PATENT DOCUMENTS

AU          80284/75        6/1975
AU      2011236087 A1      10/2011
(Continued)

OTHER PUBLICATIONS

International Search Report (Form PCT/ISA/210) issued in corresponding PCT/SE2015/050008, dated Apr. 17, 2015, 7 pages, ISA/SE, Patent-och registreringsverket, Stockholm, SE.
(Continued)

*Primary Examiner* — Scott W Dodds
(74) *Attorney, Agent, or Firm* — Buchanan Ingersoll & Rooney P.C.

(57) ABSTRACT

A method of producing a veneered element, including providing a substrate, applying a sub-layer on a surface of the substrate, applying a veneer layer on the sub-layer, and applying pressure to the veneer layer and/or the substrate, such that at least a portion of the sub-layer permeates through the veneer layer. Also, such a veneered element.

8 Claims, 3 Drawing Sheets

(51) Int. Cl.
| | |
|---|---|
| *E04F 15/04* | (2006.01) |
| *B27N 3/02* | (2006.01) |
| *B32B 5/14* | (2006.01) |
| *E04F 15/08* | (2006.01) |
| *B27N 3/04* | (2006.01) |
| *B27N 7/00* | (2006.01) |
| *B44C 1/24* | (2006.01) |
| *B32B 21/02* | (2006.01) |
| *B32B 21/08* | (2006.01) |
| *B32B 21/14* | (2006.01) |
| *B32B 27/20* | (2006.01) |
| *B32B 27/42* | (2006.01) |
| *B32B 3/30* | (2006.01) |
| *B27G 1/00* | (2006.01) |
| *B32B 37/12* | (2006.01) |
| *B32B 37/18* | (2006.01) |
| *B27N 3/00* | (2006.01) |
| *B27N 3/08* | (2006.01) |
| *B32B 38/06* | (2006.01) |

(52) U.S. Cl.
CPC .............. *B32B 27/20* (2013.01); *B32B 27/42* (2013.01); *B32B 37/1284* (2013.01); *B32B 37/18* (2013.01); *B44C 1/24* (2013.01); *B44C 5/043* (2013.01); *B44C 5/0438* (2013.01); *E04F 15/042* (2013.01); *E04F 15/045* (2013.01); *E04F 15/082* (2013.01); *E04F 15/085* (2013.01); *B27N 3/005* (2013.01); *B27N 3/08* (2013.01); *B32B 38/06* (2013.01); *B32B 2262/067* (2013.01); *B32B 2264/062* (2013.01); *B32B 2266/0214* (2013.01); *B32B 2266/0285* (2013.01); *B32B 2266/14* (2016.11); *B32B 2305/073* (2013.01); *B32B 2307/4026* (2013.01); *B32B 2307/554* (2013.01); *B32B 2317/02* (2013.01); *B32B 2317/16* (2013.01); *B32B 2471/00* (2013.01); *B32B 2607/00* (2013.01); *Y10T 156/10* (2015.01); *Y10T 156/1039* (2015.01); *Y10T 428/24132* (2015.01); *Y10T 428/24298* (2015.01); *Y10T 428/24314* (2015.01); *Y10T 428/24322* (2015.01); *Y10T 428/24331* (2015.01); *Y10T 428/24339* (2015.01); *Y10T 428/24521* (2015.01); *Y10T 428/24603* (2015.01); *Y10T 428/24612* (2015.01); *Y10T 428/24802* (2015.01); *Y10T 428/24893* (2015.01); *Y10T 428/24992* (2015.01); *Y10T 428/24994* (2015.04); *Y10T 428/24995* (2015.04); *Y10T 428/249925* (2015.04); *Y10T 428/249959* (2015.04); *Y10T 428/249982* (2015.04); *Y10T 428/249985* (2015.04); *Y10T 428/249986* (2015.04); *Y10T 428/249987* (2015.04); *Y10T 428/25* (2015.01); *Y10T 428/253* (2015.01); *Y10T 428/256* (2015.01); *Y10T 428/257* (2015.01); *Y10T 428/3167* (2015.04); *Y10T 428/31862* (2015.04); *Y10T 428/31866* (2015.04); *Y10T 428/31957* (2015.04); *Y10T 428/31989* (2015.04)

(56) References Cited

U.S. PATENT DOCUMENTS

| | | | |
|---|---|---|---|
| 2,587,064 A | 2/1952 | Rapson | |
| 2,630,395 A | 3/1953 | McCullough | |
| 2,634,534 A | 4/1953 | Brown | |
| 2,695,857 A | 11/1954 | Lewis et al. | |
| 2,720,478 A | 10/1955 | Hogg | |
| 2,831,793 A * | 4/1958 | Elmendorf | B27D 1/06 428/139 |
| 2,831,794 A | 4/1958 | Elmendorf | |
| 2,932,596 A | 4/1960 | Rayner | |
| 2,962,081 A | 11/1960 | Dobry et al. | |
| 2,992,152 A | 7/1961 | Chapman | |
| 3,032,820 A | 5/1962 | Johnson | |
| 3,135,643 A | 6/1964 | Michl | |
| 3,286,006 A | 11/1966 | Annand | |
| 3,308,013 A | 3/1967 | Bryant | |
| 3,325,302 A | 6/1967 | Hosfeld | |
| 3,342,621 A | 9/1967 | Point et al. | |
| 3,345,234 A | 10/1967 | Jecker et al. | |
| 3,392,082 A | 7/1968 | Lloyd | |
| 3,426,730 A | 2/1969 | Lawson et al. | |
| 3,463,653 A | 8/1969 | Letter | |
| 3,486,484 A | 12/1969 | Bullough | |
| 3,533,725 A | 10/1970 | Bridgeford | |
| 3,540,978 A | 11/1970 | Ames | |
| 3,565,665 A | 2/1971 | Stranch et al. | |
| 3,578,522 A | 5/1971 | Rauch | |
| 3,615,279 A | 10/1971 | Ward, Jr. | |
| 3,673,020 A | 6/1972 | De Jaeger | |
| 3,729,368 A | 4/1973 | Ingham | |
| 3,844,863 A | 10/1974 | Forsythe | |
| 3,846,219 A | 11/1974 | Kunz | |
| 3,880,687 A | 4/1975 | Elmendorf et al. | |
| 3,895,984 A | 7/1975 | Cone et al. | |
| 3,897,185 A | 7/1975 | Beyer | |
| 3,897,588 A | 7/1975 | Nohtomi | |
| 3,914,359 A | 10/1975 | Bevan | |
| 3,950,599 A | 4/1976 | Board, Jr. | |
| 3,956,542 A | 5/1976 | Roberti | |
| 3,961,108 A | 6/1976 | Rosner et al. | |
| 4,052,739 A | 10/1977 | Wada et al. | |
| 4,093,766 A | 6/1978 | Scher et al. | |
| 4,115,178 A | 9/1978 | Cone et al. | |
| 4,126,725 A | 11/1978 | Shiflet | |
| 4,131,705 A | 12/1978 | Kubinsky | |
| 4,263,373 A | 4/1981 | McCaskey, Jr. et al. | |
| 4,277,527 A | 7/1981 | Duhl | |
| 4,311,621 A | 1/1982 | Nishizawa et al. | |
| 4,313,857 A | 2/1982 | Blount | |
| 4,337,290 A | 6/1982 | Kelly et al. | |
| 4,361,612 A | 11/1982 | Shaner | |
| 4,420,351 A | 12/1983 | Lussi | |
| 4,420,525 A | 12/1983 | Parks | |
| 4,430,375 A | 2/1984 | Scher et al. | |
| 4,430,380 A | 2/1984 | Hönel | |
| 4,474,920 A | 10/1984 | Kyminas et al. | |
| 4,743,484 A | 5/1988 | Robbins | |
| 4,863,777 A | 9/1989 | Callaway et al. | |
| 4,872,825 A | 10/1989 | Ross | |
| 4,890,656 A | 1/1990 | Ohsumi et al. | |
| 4,911,969 A | 3/1990 | Ogata et al. | |
| 4,942,084 A | 7/1990 | Prince | |
| 5,034,272 A | 7/1991 | Lindgren et al. | |
| 5,059,472 A | 10/1991 | LeBell et al. | |
| 5,085,930 A | 2/1992 | Widmann et al. | |
| 5,147,486 A | 9/1992 | Hoffman | |
| 5,206,066 A | 4/1993 | Horacek | |
| 5,246,765 A | 9/1993 | Lussi et al. | |
| 5,258,216 A | 11/1993 | Von Bonin et al. | |
| 5,292,576 A | 3/1994 | Sanders | |
| 5,314,554 A | 5/1994 | Owens | |
| 5,354,259 A | 10/1994 | Scholz et al. | |
| 5,405,705 A | 4/1995 | Fujimoto | |
| 5,422,170 A | 6/1995 | Iwata et al. | |
| 5,447,752 A | 9/1995 | Cobb | |
| 5,466,511 A | 11/1995 | O'Dell et al. | |
| 5,543,193 A | 8/1996 | Tesch | |
| 5,569,424 A | 10/1996 | Amour | |
| 5,601,930 A | 2/1997 | Mehta et al. | |
| 5,604,025 A | 2/1997 | Tesch | |
| 5,609,966 A | 3/1997 | Perrin et al. | |
| 5,755,068 A | 5/1998 | Ormiston | |
| 5,766,522 A | 6/1998 | Daly et al. | |
| 5,827,788 A | 10/1998 | Miyakoshi | |
| 5,855,832 A | 1/1999 | Clausi | |

(56) References Cited

U.S. PATENT DOCUMENTS

| | | |
|---|---|---|
| 5,891,564 A | 4/1999 | Schultz et al. |
| 5,925,211 A | 7/1999 | Rakauskas |
| 5,925,296 A | 7/1999 | Leese |
| 5,942,072 A | 8/1999 | McKinnon |
| 5,976,689 A | 11/1999 | Witt et al. |
| 5,985,397 A | 11/1999 | Witt et al. |
| 6,036,137 A | 3/2000 | Myren |
| 6,089,297 A | 7/2000 | Shibagaki et al. |
| 6,103,377 A | 8/2000 | Clausi |
| 6,238,750 B1 | 5/2001 | Correll et al. |
| 6,291,625 B1 | 9/2001 | Hosgood |
| 6,468,645 B1 | 10/2002 | Clausi |
| 6,481,476 B1 | 11/2002 | Okamoto |
| 6,521,326 B1 | 2/2003 | Fischer et al. |
| 6,528,437 B1 | 3/2003 | Hepfinger et al. |
| 6,537,610 B1 | 3/2003 | Springer et al. |
| 6,620,349 B1 | 9/2003 | Lopez |
| 6,667,108 B2 | 12/2003 | Ellstrom |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Shuren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,568,322 B2 | 8/2009 | Pervan |
| 7,678,425 B2 | 3/2010 | Oldorff |
| 7,811,489 B2 | 10/2010 | Pervan |
| 7,918,062 B2 | 4/2011 | Chen |
| 8,021,741 B2 | 9/2011 | Chen |
| 8,206,534 B2 | 6/2012 | McDuff et al. |
| 8,245,477 B2 | 8/2012 | Pervan |
| 8,302,367 B2 | 11/2012 | Schulte |
| 8,349,234 B2 | 1/2013 | Ziegler et al. |
| 8,349,235 B2 | 1/2013 | Pervan et al. |
| 8,407,963 B2 | 4/2013 | Schulte |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,499,520 B2 | 8/2013 | Schulte |
| 8,617,439 B2 | 12/2013 | Pervan et al. |
| 8,635,829 B2 | 1/2014 | Schulte |
| 8,650,738 B2 | 2/2014 | Schulte |
| 8,663,785 B2 | 3/2014 | Ziegler et al. |
| 8,728,564 B2 | 5/2014 | Ziegler et al. |
| 8,752,352 B2 | 6/2014 | Schulte |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,109,366 B2 | 8/2015 | Schulte |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 10,344,379 B2 | 7/2019 | Pervan et al. |
| 10,364,578 B2 | 7/2019 | Pervan |
| 10,392,812 B2 | 8/2019 | Pervan |
| 10,442,152 B2 | 10/2019 | Schulte |
| 10,442,164 B2 | 10/2019 | Schulte |
| 10,493,729 B2 | 12/2019 | Pervan et al. |
| 10,513,094 B2 | 12/2019 | Persson et al. |
| 10,800,186 B2 | 10/2020 | Pervan et al. |
| 10,828,881 B2 | 11/2020 | Bergelin et al. |
| 10,857,765 B2 | 12/2020 | Schulte |
| 10,899,166 B2 | 1/2021 | Pervan et al. |
| 10,913,176 B2 | 2/2021 | Lindgren et al. |
| 10,926,509 B2 | 2/2021 | Schulte |
| 10,981,362 B2 | 4/2021 | Ziegler et al. |
| 10,988,941 B2 | 4/2021 | Ziegler et al. |
| 11,040,371 B2 | 6/2021 | Jacobsson |
| 11,046,063 B2 | 6/2021 | Persson et al. |
| 11,072,156 B2 | 7/2021 | Schulte |
| 11,090,972 B2 | 8/2021 | Persson et al. |
| 11,135,814 B2 | 10/2021 | Pervan et al. |
| 11,167,533 B2 | 11/2021 | Ziegler et al. |
| 11,235,565 B2 | 2/2022 | Pervan et al. |
| 11,313,123 B2 | 4/2022 | Pervan et al. |
| 11,318,726 | 5/2022 | Pervan et al. |
| 2001/0006704 A1 | 7/2001 | Chen et al. |
| 2001/0009309 A1 | 7/2001 | Taguchi et al. |
| 2002/0031620 A1 | 3/2002 | Yuzawa et al. |
| 2002/0054994 A1 | 5/2002 | Dupre et al. |
| 2002/0100231 A1 | 8/2002 | Miller |
| 2002/0155297 A1 | 10/2002 | Schuren |
| 2003/0008130 A1 | 1/2003 | Kaneko |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0108760 A1 | 6/2003 | Haas et al. |
| 2003/0208980 A1 | 11/2003 | Miller et al. |
| 2004/0035078 A1 | 2/2004 | Pervan |
| 2004/0088946 A1 | 5/2004 | Liang et al. |
| 2004/0123542 A1 | 7/2004 | Grafenauer |
| 2004/0137255 A1 | 7/2004 | Martinez et al. |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0250911 A1 | 12/2004 | Vogel |
| 2004/0255541 A1 | 12/2004 | Thiers et al. |
| 2005/0003099 A1 | 1/2005 | Quist |
| 2005/0016107 A1 | 1/2005 | Rosenthal et al. |
| 2005/0079780 A1 | 4/2005 | Rowe et al. |
| 2005/0136234 A1 | 6/2005 | Hak et al. |
| 2005/0153150 A1 | 7/2005 | Wellwood et al. |
| 2005/0166514 A1 | 8/2005 | Pervan |
| 2005/0193677 A1 | 9/2005 | Vogel |
| 2005/0208255 A1 | 9/2005 | Pervan |
| 2005/0227040 A1 | 10/2005 | Toupalik |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0048474 A1 | 3/2006 | Pervan et al. |
| 2006/0070321 A1 | 4/2006 | Au |
| 2006/0070325 A1 | 4/2006 | Magnusson |
| 2006/0145384 A1 | 7/2006 | Singer |
| 2006/0154015 A1 | 7/2006 | Miller et al. |
| 2006/0156672 A1 | 7/2006 | Laurent et al. |
| 2006/0172118 A1 | 8/2006 | Han et al. |
| 2006/0182938 A1 | 8/2006 | Oldorff |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0102108 A1 | 5/2007 | Zheng |
| 2007/0125275 A1 | 6/2007 | Bui |
| 2007/0148339 A1 | 6/2007 | Wescott |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0256804 A1 | 11/2007 | Garcis Espino et al. |
| 2008/0000179 A1 | 1/2008 | Pervan et al. |
| 2008/0000190 A1 | 1/2008 | Håkansson |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0093013 A1 | 4/2008 | Muller |
| 2008/0152876 A1 | 6/2008 | Magnusson |
| 2008/0176039 A1 | 7/2008 | Chen et al. |
| 2008/0263985 A1 | 10/2008 | Hasch et al. |

(56) References Cited

U.S. PATENT DOCUMENTS

| | | |
|---|---|---|
| 2009/0056257 A1 | 3/2009 | Mollinger et al. |
| 2009/0124704 A1 | 5/2009 | Jenkins |
| 2009/0135356 A1 | 5/2009 | Ando |
| 2009/0145066 A1 | 6/2009 | Pervan |
| 2009/0155612 A1 | 6/2009 | Pervan et al. |
| 2009/0165946 A1 | 7/2009 | Suzuki |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0092731 A1* | 4/2010 | Pervan ............... B27M 3/04 428/172 |
| 2010/0136303 A1 | 6/2010 | Kreuder |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0304089 A1 | 12/2010 | Magnusson |
| 2010/0307675 A1 | 12/2010 | Buhlmann |
| 2010/0307677 A1 | 12/2010 | Buhlmann |
| 2010/0311854 A1 | 12/2010 | Thiers et al. |
| 2010/0314368 A1 | 12/2010 | Groeke |
| 2010/0319282 A1 | 12/2010 | Ruland |
| 2010/0323187 A1 | 12/2010 | Kalwa |
| 2010/0330376 A1 | 12/2010 | Trksak |
| 2011/0027501 A1 | 2/2011 | Guo |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0262720 A1 | 10/2011 | Riebel et al. |
| 2011/0274872 A1 | 11/2011 | Yu |
| 2011/0283642 A1 | 11/2011 | Meirlaen et al. |
| 2011/0283650 A1 | 11/2011 | Pervan et al. |
| 2011/0287211 A1 | 11/2011 | Bailey et al. |
| 2011/0293823 A1 | 12/2011 | Bruderer et al. |
| 2011/0293906 A1 | 12/2011 | Jacobsson |
| 2012/0048487 A1 | 3/2012 | Brewster |
| 2012/0124932 A1 | 5/2012 | Schulte et al. |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0276348 A1 | 11/2012 | Clausi et al. |
| 2012/0279161 A1 | 11/2012 | Håkansson et al. |
| 2012/0288689 A1 | 11/2012 | Hansson et al. |
| 2012/0308774 A1 | 12/2012 | Persson et al. |
| 2013/0025216 A1 | 1/2013 | Reichwein et al. |
| 2013/0092314 A1 | 4/2013 | Zeigler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0196119 A1 | 8/2013 | Dobecz |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0027020 A1 | 1/2014 | Klaeusler et al. |
| 2014/0044872 A1 | 2/2014 | Pervan |
| 2014/0075874 A1 | 3/2014 | Pervan et al. |
| 2014/0147585 A1 | 5/2014 | Smith |
| 2014/0171554 A1 | 6/2014 | Ziegler et al. |
| 2014/0178630 A1 | 6/2014 | Pervan et al. |
| 2014/0018661 A1 | 7/2014 | Pervan |
| 2014/0199558 A1 | 7/2014 | Pervan et al. |
| 2014/0234531 A1 | 8/2014 | Ziegler et al. |
| 2014/0290171 A1 | 10/2014 | Vermeulen |
| 2014/0329064 A1 | 11/2014 | Döhring et al. |
| 2015/0017461 A1 | 1/2015 | Lindgren et al. |
| 2015/0072111 A1 | 3/2015 | Rischer et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0118456 A1 | 4/2015 | Carlborg et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0297174 A1 | 10/2016 | Kim |
| 2016/0322041 A1 | 11/2016 | Kim |
| 2016/0326744 A1 | 11/2016 | Döhring et al. |
| 2016/0368180 A1 | 12/2016 | Ziegler et al. |
| 2016/0369507 A1 | 12/2016 | Pervan et al. |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Lundblad et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Persson et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0277039 A1 | 9/2019 | Håkansson et al. |
| 2019/0284821 A1 | 9/2019 | Pervan |
| 2019/0292796 A1 | 9/2019 | Pervan et al. |
| 2019/0338534 A1 | 11/2019 | Pervan |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0094512 A1 | 3/2020 | Schulte |
| 2020/0164622 A1 | 5/2020 | Pervan et al. |
| 2020/0215799 A1 | 7/2020 | Hedlund et al. |
| 2020/0223197 A1 | 7/2020 | Hedlund et al. |
| 2021/0001647 A1 | 1/2021 | Pervan et al. |
| 2021/0008863 A1 | 1/2021 | Bergelin et al. |
| 2021/0078305 A1 | 3/2021 | Schulte |
| 2021/0010131 A1 | 4/2021 | Lindgren et al. |
| 2021/0197534 A1 | 7/2021 | Ziegler et al. |
| 2021/0323297 A1 | 10/2021 | Slottemo et al. |
| 2022/0009248 A1 | 1/2022 | Ryberg et al. |
| 2022/0024189 A1 | 1/2022 | Ziegler et al. |
| 2022/0024195 A1 | 1/2022 | Schulte |
| 2022/0063326 A1 | 3/2022 | Persson et al. |

FOREIGN PATENT DOCUMENTS

| | | |
|---|---|---|
| CH | 298894 A | 5/1954 |
| CN | 1709717 A | 12/2005 |
| CN | 102166775 A | 8/2011 |
| CN | 202200608 U | 4/2012 |
| CN | 104084994 A | 10/2014 |
| DE | 1 815 312 A1 | 7/1969 |
| DE | 7148789 U | 4/1972 |
| DE | 29 39 828 A1 | 4/1981 |
| DE | 33 34 921 A1 | 4/1985 |
| DE | 36 34 885 A1 | 4/1988 |
| DE | 42 33 050 A1 | 4/1993 |
| DE | 42 36 266 A1 | 5/1993 |
| DE | 202 14 532 U1 | 2/2004 |
| DE | 102 45 914 A1 | 4/2004 |
| DE | 103 00 247 A1 | 7/2004 |
| DE | 103 31 657 A1 | 2/2005 |
| DE | 20 2006 007 797 U1 | 8/2006 |
| DE | 10 2005 046 264 A1 | 4/2007 |
| DE | 10 2006 024 593 A1 | 12/2007 |
| DE | 10 2006 058 244 A1 | 6/2008 |
| DE | 10 2007 043 202 A1 | 3/2009 |
| DE | 20 2009 008 367 U1 | 9/2009 |
| DE | 10 2010 045 266 A | 3/2012 |
| DE | 20 2013 011 776 U1 | 7/2014 |
| DE | 20 2014 102 031 U1 | 7/2014 |
| DE | 20 2013 012 020 U1 | 2/2015 |
| DE | 10 2013 113 125 A1 | 5/2015 |
| EP | 0 129 430 A2 | 12/1984 |
| EP | 0 234 220 A2 | 9/1987 |

(56) References Cited

FOREIGN PATENT DOCUMENTS

| | | |
|---|---|---|
| EP | 0 129 430 B1 | 1/1990 |
| EP | 0 355 829 A2 | 2/1990 |
| EP | 0 592 013 A2 | 4/1994 |
| EP | 0 611 408 A1 | 8/1994 |
| EP | 0 656 443 A1 | 6/1995 |
| EP | 0 611 408 B1 | 9/1996 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 744 477 B1 | 1/2000 |
| EP | 0 993 934 A2 | 4/2000 |
| EP | 1 035 255 A1 | 9/2000 |
| EP | 1 125 971 A1 | 8/2001 |
| EP | 1 136 251 A2 | 9/2001 |
| EP | 1 209 199 A1 | 5/2002 |
| EP | 1 249 322 A1 | 10/2002 |
| EP | 1 262 607 A1 | 12/2002 |
| EP | 1 454 763 A2 | 9/2004 |
| EP | 1 242 702 B1 | 11/2004 |
| EP | 1 498 241 A2 | 1/2005 |
| EP | 1 584 378 A1 | 10/2005 |
| EP | 1 657 055 A1 | 5/2006 |
| EP | 1 681 103 A2 | 7/2006 |
| EP | 1 690 603 A1 | 8/2006 |
| EP | 1 847 385 A1 | 10/2007 |
| EP | 1 961 556 A1 | 8/2008 |
| EP | 1 997 623 A1 | 12/2008 |
| EP | 2 025 484 A1 | 2/2009 |
| EP | 1 454 763 B1 | 8/2009 |
| EP | 2 105 320 A1 | 9/2009 |
| EP | 2 119 550 A1 | 11/2009 |
| EP | 2 246 500 A2 | 11/2010 |
| EP | 2 263 867 A1 | 12/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 2 353 861 A1 | 8/2011 |
| EP | 1 847 385 B1 | 9/2011 |
| EP | 2 263 867 B1 | 3/2012 |
| EP | 2 902 196 A1 | 8/2015 |
| EP | 2 902 196 B1 | 8/2016 |
| FR | 801 433 A | 8/1936 |
| FR | 2 873 953 A1 | 2/2006 |
| GB | 785008 | 10/1957 |
| GB | 984 170 A | 2/1965 |
| GB | 1090450 | 11/1967 |
| GB | 1 561 820 A | 3/1980 |
| GB | 2 238 983 A | 6/1991 |
| GB | 2 248 246 A | 4/1992 |
| GB | 2 464 541 A | 4/2010 |
| JP | S51-128409 A | 11/1976 |
| JP | S52-087212 A | 7/1977 |
| JP | S53-148506 | 12/1978 |
| JP | S56-049259 A | 5/1981 |
| JP | S56-151564 A | 11/1981 |
| JP | S58-084761 A | 5/1983 |
| JP | S59-101312 A | 6/1984 |
| JP | S64-062108 A | 3/1989 |
| JP | H02-188206 A | 7/1990 |
| JP | H02-198801 A | 8/1990 |
| JP | H02-229002 A | 9/1990 |
| JP | H03-030905 A | 2/1991 |
| JP | H03-211047 A | 9/1991 |
| JP | H03-267174 A | 11/1991 |
| JP | H04-107101 A | 4/1992 |
| JP | H04-247901 A | 9/1992 |
| JP | H04-269506 A | 9/1992 |
| JP | H05-077362 A | 3/1993 |
| JP | H05-237809 A | 9/1993 |
| JP | H06-312406 A | 11/1994 |
| JP | H07-060704 A | 3/1995 |
| JP | H08-207012 A | 8/1996 |
| JP | H09-164651 A | 6/1997 |
| JP | H10-002098 A | 1/1998 |
| JP | H10-18562 A | 1/1998 |
| JP | H10-086107 A | 4/1998 |
| JP | 2925749 B2 | 7/1999 |
| JP | H11-291203 A | 10/1999 |
| JP | 2000-226931 A | 8/2000 |
| JP | 2000-263520 A | 9/2000 |
| JP | 2001-287208 A | 10/2001 |
| JP | 2001-329681 A | 11/2001 |
| JP | 2003-311717 A | 11/2003 |
| JP | 2003-311718 A | 11/2003 |
| JP | 2004-068512 A | 3/2004 |
| JP | 2004-076476 A | 3/2004 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-098755 A | 4/2007 |
| JP | 2007-216692 A | 8/2007 |
| JP | 2007-268843 A | 10/2007 |
| JP | 2008-188826 A | 8/2008 |
| JP | 2010-017963 A | 1/2010 |
| JP | 2011-110768 A | 6/2011 |
| KR | 10-0997149 B1 | 11/2010 |
| KR | 10-1439066 B1 | 9/2014 |
| NZ | 225556 A1 | 2/1992 |
| SE | 469 326 B | 6/1993 |
| WO | WO 92/06832 A1 | 4/1992 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/00409 A1 | 1/2001 |
| WO | WO 01/64408 A1 | 9/2001 |
| WO | WO 01/68367 A1 | 9/2001 |
| WO | WO 01/92037 A2 | 12/2001 |
| WO | WO 02/42167 A2 | 5/2002 |
| WO | WO 02/42373 A1 | 5/2002 |
| WO | WO 2004/050359 A1 | 6/2004 |
| WO | WO 2004/067874 A2 | 8/2004 |
| WO | WO 2005/035209 A2 | 4/2005 |
| WO | WO 2005/054599 A1 | 6/2005 |
| WO | WO 2005/054600 A1 | 6/2005 |
| WO | WO 2005/066431 A2 | 7/2005 |
| WO | WO 2005/097874 A2 | 10/2005 |
| WO | WO 2005/116337 A1 | 12/2005 |
| WO | WO 2005/116361 A1 | 12/2005 |
| WO | WO 2006/007413 A1 | 1/2006 |
| WO | WO 2006/013469 A1 | 2/2006 |
| WO | WO 2006/042651 A1 | 4/2006 |
| WO | WO 2006/043893 A1 | 4/2006 |
| WO | WO 2006/126930 A1 | 11/2006 |
| WO | WO 2007/042258 A1 | 4/2007 |
| WO | WO 2007/059294 A2 | 5/2007 |
| WO | WO 2008/004960 A2 | 1/2008 |
| WO | WO 2008/148771 A1 | 12/2008 |
| WO | WO 2009/065768 A1 | 5/2009 |
| WO | WO 2009/065769 A2 | 5/2009 |
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A1 | 10/2009 |
| WO | WO 2010/046698 A1 | 4/2010 |
| WO | WO 2010/087752 A1 | 8/2010 |
| WO | WO 2011/058233 A1 | 5/2011 |
| WO | WO 2011/129755 A2 | 10/2011 |
| WO | WO 2011/129757 A1 | 10/2011 |
| WO | WO 2011/141851 A2 | 11/2011 |
| WO | WO 2012/004699 A2 | 1/2012 |
| WO | WO 2013/079950 A1 | 6/2013 |
| WO | WO 2013/167576 A2 | 11/2013 |
| WO | WO 2013/182191 A2 | 12/2013 |
| WO | WO 2014/017972 A1 | 1/2014 |
| WO | WO 2014/109699 A1 | 7/2014 |
| WO | WO 2015/078434 A1 | 6/2015 |
| WO | WO 2015/105455 A1 | 7/2015 |

(56) References Cited

FOREIGN PATENT DOCUMENTS

| WO | WO 2015/105456 A1 | 7/2015 |
|---|---|---|
| WO | WO 2015/174909 A1 | 11/2015 |
| WO | WO 2016/151435 A1 | 9/2016 |

OTHER PUBLICATIONS

International Search Report and Written Opinion (Forms PCT/ISA/210/PCT/ISA/237) dated Aug. 14, 2015 in PCT/SE2015/050524, ISA/SE, Patent-och registreringsverket, Stockholm, SE, 16 pages.
Extended European Search Report issued in EP 15735146.1, dated Jul. 18, 2017, European Patent Office, Munich, DE, 10 pages.
Extended European Search Report issued in EP 15791987.9, dated Jan. 8, 2018, European Patent Office, Munich, DE, 9 pages.
Official Action, "Decision of Refusal," issued in JP Patent Application No. 2016-544402, dated Jul. 5, 2019, Japanese Patent Office, Tokyo, Japan, 8 pages (Japanese-language version and English-language translation).
Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Valinge Innovation, Technical Disclosure entitled "WFF Embossing," May 15, 2009, IP.com No. IPCOM000183105D, IP.com PriorArtDatabase, 36 pages.
Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.
BTLSR Toledo, Inc. website, http://www.btlresins.com/more.html. "Advantages to Using Powdered Resins," May 26, 2007, 2 pages, per the Internet Archive WayBackMachine.
Fang, Chang-Hua, et al., "Densification of wood veneers by compression combined with heat and steam," *Eur. J. Wood Prod.*, 2012, pp. 155-163, vol. 70, Springer-Verlag, Germany (available online Feb. 1, 2011).
Floor Daily, "Shaw Laminates: Green by Design," Aug. 13, 2007, 1 pg, Dalton, GA.
Le Fur, X., et al., "Recycling melamine-impregnated paper waste as board adhesives," published online Oct. 26, 2004, pp. 419-423, vol. 62, Springer-Verlag, DE, XP055332791.

Lstiburek, Joseph, "BSD-106: Understanding Vapor Barriers," Apr. 15, 2011, *Building Science Corporation*, pp. 1-18; (retrieved Sep. 26, 2018 https://buildingscience.com/documents/digests/bsd-106-understanding-vapor-barriers).
Mercene Labs, official home page, retrieved Feb. 23, 2017, 3 pages, retrieved from the Internet: http://www.mercenelabs.com/technology/, according to the Internet Archive WayBack Machine this page was available on Jan. 22, 2013.
Mercene Labs, "Industrial coatings," retrieved Mar. 28, 2020, 2 pages, retrieved from the Internet https://web.archive.org/web/20140825055945/http://www.mercenelabs.com/products/coating-of-difficult-substrates/ according to the Internet Archive WayBack Machine this page was available on Aug. 25, 2014 (XP055674250).
Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.
Odian, George, "Principles of Polymerization," 1991, $3^{rd}$ Edition, 5 pages incl. pp. 122-123, John Wiley & Sons, Inc., New York, NY, USA.
Parquet International, "Digital Printing is still an expensive process," Mar. 2008, cover page/pp. 78-79, www.parkettmagazin.com.
Schulte, Guido, U.S. Appl. No. 17/352,942 entitled "Method for Producing a Floorboard," filed in the U.S. Patent and Trademark Office on Jun. 21, 2021.
Ziegler, Göran, et al., U.S. Appl. No. 17/496,441 entitled "Method to Produce a Veneered Element and a Veneered Element," filed in the U.S. Patent and Trademark Office on Oct. 7, 2021.
Nilsson, Magnus, et al., U.S. Appl. No. 17/543,962 entitled "Method to Produce a Veneered Element and a Veneered Element," filed in the U.S. Patent and Trademark Office Dec. 7, 2021.
Extended European Search Report issued in EP 21214173.3, dated Mar. 9, 2022, European Patent Office, Munich, DE, 9 pages.
Ziegler, Göran, et al., U.S. Appl. No. 17/697,417 entitled "Method to Produce a Building Panel and a Building Panel," filed in the U.S. Patent and Trademark Office dated Mar. 17, 2022.
Pervan, Darko, et al., U.S. Appl. No. 17/711,487 entitled "Wood Fibre Based Panel with a Surface Layer," filed in the U.S. Patent and Trademark Office dated Apr. 1, 2022.
Rittinge, Rickard, et al., U.S. Appl. No. 17/769,594 entitled "Wood Fibre Based Panel and a Method for Obtaining Such Panel," filed in the U.S. Patent and Trademark Office dated Apr. 15, 2022.

\* cited by examiner

METHOD OF PRODUCING A VENEERED ELEMENT

CROSS REFERENCE TO RELATED APPLICATIONS

The present application is a continuation of U.S. application Ser. No. 14/593,458, filed on Jan. 9, 2015, which claims the benefit of Swedish Application No. 1450023-5, filed on Jan. 10, 2014, the benefit of Swedish Application No. 1450552-3, filed on May 12, 2014, and the benefit of Swedish Application No. 1451154-7, filed on Sep. 29, 2014. The entire contents of each of U.S. application Ser. No. 14/593,458, Swedish Application No. 1450023-5, Swedish Application No. 1450552-3, and Swedish Application No. 1451154-7 are hereby incorporated herein by reference in their entirety.

TECHNICAL FIELD

The disclosure relates to a method of producing a veneered element and such a veneered element.

TECHNICAL BACKGROUND

Floor coverings having a wooden surface may be of several different types. Solid wood flooring is formed of a solid piece of wood in form of a plank. Engineered wood flooring is formed of a surface layer of wood glued to a core. The core may be a lamella core or a wood-based panel such as plywood, MDF or HDF. The wooden surface layer may as an example have a thickness of 2-10 mm.

A wooden floor covering may also be formed by gluing a wood veneer to a core, for example, a wood-based panel such as particleboard, MDF or HDF. Wood veneer is a thin wood layer, for example having a thickness of 0.2-1 mm. A flooring with a separate surface layer glued to a core of for example HDF or plywood is more moisture stable than solid wood floorings.

Compared to solid wood and engineered wood floorings, wood veneer floorings can be produced to a lower cost since only a thin wood layer is used. However, a wood veneer layer cannot be sanded as a solid wood or engineered wood flooring can be.

As an alternative to wood floorings, laminate floorings are also available. Direct pressed laminated flooring usually comprises a core of a 6-12 mm fibre board, a 0.2 mm thick upper decorative surface layer of laminate and a 0.1-0.2 mm thick lower balancing layer of laminate, plastic, paper or like material.

A laminate surface conventionally comprise two paper sheets, a 0.1 mm thick printed decorative paper and a transparent 0.05-0.1 mm thick overlay intended to protect the decorative paper from abrasion. The transparent overlay, which is made of α-cellulose fibres, comprises small hard and transparent aluminium oxide particles, which gives the surface layer a high wear resistance.

The printed decorative paper and the overlay are impregnated with melamine resin and laminated to a wood fibre based core under heat and pressure. The two papers have prior to pressing a total thickness of about 0.3 mm and they are after pressing compressed to about 0.2 mm.

A wood veneer may have a lower impact resistance than laminate floorings and the production cost is high, compared to laminate floorings, when high quality veneers are to be used.

Recently new "paper free" floor types have been developed with solid surfaces comprising a substantially homogenous powder mix of fibres, binders and wear resistant particles referred to as WFF (Wood Fibre Floor). The mix is applied on a wood-based panel such as MDF or HDF, and subsequently applying heat and pressure to the mix to form a surface layer on the panel. Such a flooring and process are described in WO 2009/065769.

WO 2009/065769 also discloses a thin surface layer such as wood veneer layer, which is applied on a sub-layer comprising, for example, cork or wood fibres mixed with a binder. The sub-layer is applied on wood fibre based core.

U.S. Pat. No. 2,831,794 discloses a process for manufacturing veneer panels. A green veneer is applied on a mat of resin coated core particles of ligno-cellulose fibrous particles. Adhesive is applied on the veneer to bond the veneer to the fibrous core, and to form a dense surface zone in the fibrous core. The material of the core serves to fill knot holes or open flaws in the veneer. When heat and pressure is applied, the result is the formation of a panel, with the surface layer of the particles filling whatever flaws or holes would otherwise the present in the veneer.

U.S. Pat. No. 2,419,614 discloses a coated wood product wherein a plywood is coated by a covering or overlay material consisting of mixtures of sawdust and synthetic resin. The veneer layer is coated by the covering or overlay material such that the veneer is no longer visible. The covering forms the uppermost layer of the product.

In the above description, the different types of product have been described with reference to floorings. However, the same material and problems applies for other types of building panels such as wall panels, ceiling panels, and for furniture components.

SUMMARY

It is an object of at least embodiments of the disclosure to provide an improvement over the above described techniques and known art.

A further object of at least embodiments of the disclosure is to improve the wear resistance of a veneer surface.

A further object of at least embodiments of the disclosure is to reduce the cost for producing surface with an attractive design.

A further object of at least embodiments of the disclosure is to use veneers of low quality and/or thin thickness.

A further object of at least embodiments of the disclosure is to provide a wood veneer surface having the look of a solid wood surface.

A further object of at least embodiments of the disclosure is to provide a veneer surface having an attractive design.

A further object of at least embodiments of the disclosure is to control the design of a veneer surface.

At least some of these and other objects and advantages that will be apparent from the description have been achieved by a method of producing a veneered element, comprising
  providing a substrate,
  applying a sub-layer on a first surface of the substrate,
  applying a veneer layer on the sub-layer, and
  applying pressure to the veneer layer and/or the substrate, such that at least a portion of the sub-layer permeates through the veneer layer.
  Said at least a portion of the sub-layer may permeate partly through, the veneer layer, or may permeate completely through the veneer layer.

Preferably, the method further comprises controlling a design of the veneer layer by determining a level of permeation of the sub-layer through the veneer layer. Determining a level of permeation may involve selecting or adjusting the permeation. This may involve selecting or adjusting a fluid pressure of the sub-layer when applying pressure.

By determining is, for example, meant determining by visual impression of the design of the veneer layer.

Preferably, at least a portion of the sub-layer is visible at the surface of the veneer layer facing away from the substrate.

The substrate is preferably a pre-fabricated substrate. Preferably, the substrate is manufactured in a preceding manufacturing process.

An advantage of at least certain embodiments is that the surface design of the veneered element may be changed or altered by a portion of the sub-layer permeating through the veneer. By applying pressure to the veneer layer and/or the substrate, a part of the sub-layer flows through pores, or cracks or holes, of the veneer such that a part of the sub-layer becomes visible at the surface of the veneer facing away from the substrate. Thereby, the design of the veneer is changed, especially if the sub-layer comprises pigments. A new design can be created, or features of the veneer such as cracks and knots can be intensified by the sub-layer being visible at the surface of the veneer.

The veneer layer forms the visible surface of the veneered element. The design of the veneer layer, permeated by at a least a portion of the sub-layer, forms the design of the veneered element.

The veneer layer may also be reinforced by being arranged on the sub-layer. Further, the veneer layer may obtain improved wear resistant properties by being at least partly impregnated by the sub-layer. The sub-layer arranged under the veneer layer may also improve impact resistance properties of the veneer. The sub-layer may comprise a binder or lacquer giving the veneer improved wear resistant properties. The sub-layer may also comprise wear resistant particles.

Since the sub-layer also flows into the substrate during pressing, the sub-layer provides improved impact, surface soundness, adhesive capacity, reduced swelling, etc.

Furthermore, an advantage of at least certain embodiments is that the sub-layer may fill any cracks, holes, or knots of the veneer layer. Thereby, there is no need, or at least a reduced need, to putty cracks, holes or knots of the veneer layer. Thereby, a costly operation often made by hand is eliminated or at least reduced by arranging the veneer layer on a sub-layer when pressing the veneer to the substrate.

By arranging the veneer on the sub-layer, and by at least a part of the sub-layer flowing through the veneer such that cracks, cavities or knots are filled by the sub-layer, a thinner veneer may be used, or a veneer of lower quality may be used, for example, containing more irregularities and defects.

Furthermore, by including pigments in the sub-layer, the veneer may be coloured. A glazing effect, a lazuring effect and/or staining effect may be obtained.

By including additives to the sub-layer, the properties of the veneer layer may be changed. For example, sound-absorbing fillers, such as cork particles, may be added to the sub-layer to improve the sound absorbing properties of the veneered element. Anti-static agents may be added to the sub-layer. Additives improving the heat transfer of the veneered element may also be added.

In an embodiment wherein the substrate is a core, the core and the veneered element being bonded to the core form a building panel or a furniture component. The building panel may be a floor panel, a ceiling panel, a wall panel, a door panel, a worktop, skirting boards, mouldings, edging profiles, etc.

In an embodiment, the veneered element is formed as a separate element, which later may be adhered to a component. The substrate may be a carrier for the veneer layer and the sub-layer, or may be a temporary carrier from which the veneer layer and the sub-layer later are removed.

The method may further comprise controlling permeation of the sub-layer through the veneer layer. Thereby, the design and appearance of the surface may be varied and controlled by varying and controlling fluid pressure, binder concentration, type of binder, filler concentration, veneer properties, etc. By controlling these parameters, the amount of the sub-layer which permeates the veneer layer can be controlled, and thereby the design of the veneer layer can be changed in a controlled manner.

The method may further comprise processing the veneer layer by abrasive machining prior to applying pressure to the veneer layer and/or the substrate. The method may further comprise brushing the veneer layer prior to applying pressure to the veneer layer and/or the substrate. By abrasive machining the veneer layer, material from the veneer layer is mechanically removed.

In one embodiment, controlling permeation of the sub-layer through the veneer layer may comprise abrasive machining the veneer layer prior to applying pressure to the veneer layer and/or the substrate.

In one embodiment, controlling permeation of the sub-layer through the veneer layer may comprise brushing the veneer layer prior to applying pressure to the veneer layer and/or the substrate.

By abrasive machining and/or brushing the veneer layer, holes, cavities and/or cracks are formed in the veneer layer. Abrasive machining and/or brushing the veneer layer may enlarge existing holes, cavities and/or cracks, and/or form new holes, cavities and/or cracks. By forming, or enlarging existing, holes, cavities, and cracks, the sub-layer permeates more easily through the veneer layer. Thereby, the permeation of the sub-layer through the veneer layer is increased, and the design of the veneer layer can be controlled and changed.

The veneer layer may be brushed prior to being applied on the sub-layer, or when being applied on the sub-layer. The same applies to abrasive machining of the veneer layer.

Abrasive machining of the veneer layer may be performed by an abrasive tool. The abrasive tool may be a brushing device. The abrasive tool may be brush filaments, abrasive strips, sanding belts, sanding disks, grinding wheels, cutting tools such as water jet, etc.

The veneer layer may be processed by an abrasive tool such that veneer material with low density is removed while veneer material with higher density remains. The abrasive tool may be harder than at least portions of the veneer layer.

Both surfaces, or only one of the surfaces, of the veneer layer, may be machined abrasively. A lower surface of the veneer layer adapted to face the sub-layer may be machined. An upper surface of the veneer layer adapted to facing upwards may be machined. By machining abrasively the upper surface of the veneer layer, flowing of the sub-layer in a direction parallel to the surface of the veneer layer is increased. By machining abrasively the lower surface of the veneer layer, the sub-layer may fill cavities formed in the lower surface of the veneer layer.

Machining abrasively may be performed at different levels in the veneer layer. Cavities, holes and/or cracks may be extending through the veneer layer, or may extend partly through the veneer layer. The depth of the cavities, holes and/or cavities may substantially equal the thickness of the veneer layer, or may be less than the thickness of the veneer layer.

Machining the veneer layer prior to applying pressure may also be combined with machining performed after pressure has been applied to form the veneered element.

The abrasive machining and/or processing of the veneer layer may, for example, include brushing, sanding, grinding, blasting, local compressing, tearing, splitting, compressed air, etc.

Controlling permeation of the sub-layer through the veneer layer may comprise processing the veneer layer prior to applying pressure to the veneer layer and/or the substrate. Such processing may include heating, for example, by thermal radiation, convective heating, and/or conductive heating, steaming, and/or drying veneer prior to applying pressure to the veneer layer and/or the substrate. Permeation may also be controlled by applying additives to the veneer layer adjusting the permeation of the sub-layer through the veneer layer. As an example, an additive reducing permeation of the sub-layer through the veneer layer, for example, by blocking permeation, may be applied. Alternatively or in combination, an additive degrading the veneer layer, thus increasing permeation may also be applied on the veneer layer.

Controlling permeation of the sub-layer through the veneer layer may comprise compressing the veneer prior to applying the veneer on the sub-layer. By compressing the veneer, the density of at least portions of the veneer is increased, thus reducing permeation of the sub-layer through at least portions of the veneer layer during pressing. Compressing may be performed by pressing plates and/or rollers with embossings. The compression, preferably combined with heating, preferably heating to a temperature exceeding 100° C., may result in a remaining increase in density.

Controlling permeation of the sub-layer through the veneer layer may comprise controlling a fluid pressure of the sub-layer during pressing. A fluid pressure of the sub-layer is formed by applying pressure to the veneer layer and/or the substrate. In one embodiment, the sub-layer may be in fluid form when applied on the substrate, or may be transformed into fluid form by applying heat and pressure, such as the case for a thermosetting binder applied in powder form. By increasing the fluid pressure, a larger amount of the sub-layer permeates through the veneer layer, and/or longer way through the veneer layer, and/or permeates into the veneer layer in a direction parallel to a plane of the veneer layer, such that larger spots of the sub-layer are visible from the surface of the veneer layer. Furthermore, when the sub-layer includes a thermosetting binder, the cross-linking reaction results in forming of condensation water, transforming into steam under the applied heat and pressure, thereby increasing the fluid pressure. The cross-linking also results in solidification of a part of the sub-layer, thus further pressing remaining uncured binder of the sub-layer.

Controlling the fluid pressure of the sub-layer may comprise adjusting a concentration of a binder in the sub-layer. By increasing the concentration of the binder in the sub-layer, the part of the sub-layer that flows when heat and pressure are applied increases, and thereby a larger part of the sub-layer may permeate through the veneer layer. When the binder flows, the binder brings any pigments to upper parts of the veneer.

Controlling the fluid pressure of the sub-lay may comprise adjusting the type of binder used in the sub-layer. Different binders have different properties, such as how fast the binder cures and hardens. When using a binder that cures rapidly, less permeation of the sub-layer occurs compared to a binder that cures more slowly, thus being in liquid form over a longer time and allowing permeation through the veneer layer.

The design of the veneered element may also be performed by controlling a ratio between pigment and binder of the sub-layer. By adjusting the binder concentration, and the ratio pigment/binder, the amount of pigment permeating through the veneer layer can be controlled. The binder brings the pigments when the binder flows during pressing. The amount of pigment that permeates through the veneer layer may also be controlled and adjust by choosing the size of the pigment particles. Smaller pigment particles permeate more easily through the veneer layer than larger pigment particles.

Controlling the fluid pressure may comprise adjusting the moisture content of the sub-layer. By increasing the moisture content of the sub-layer, more steam is formed when heat and pressure is applied, which forms an increased fluid pressure and thereby increased permeation of the sub-layer through the veneer layer. Contrary, if less permeation is desired, the moisture content of the sub-layer may be decreased, for example by drying before pressing.

Controlling the fluid pressure may comprise adjusting the pressure applied to the veneer layer and/or the substrate. By increasing the pressure, the fluid pressure of the sub-layer is increased. By increasing the fluid pressure, a larger amount of the sub-layer permeates through the veneer layer as described above.

Controlling the fluid pressure may comprise generating a gas pressure in the sub-layer. The gas pressure increases the fluid pressure of the sub-layer, thus resulting in that the sub-layer permeates through the sub-layer in an increased extent.

Generating the gas pressure may comprise including chemical and/or physical blowing agents in the sub-layer. When reacting, the chemical and/or physical blowing agents form a gas pressure in the sub-layer.

Controlling permeation of the sub-layer through the veneer layer may comprise including fillers in the sub-layer. By increasing the amount of fillers in the sub-layer, the less the sub-layer permeates through the veneer layer. The fillers may reduce flowing of the sub-layer such that the sub-layer permeates more difficult through the veneer layer. Furthermore, some fillers, for example, wood particles, absorb the binder to a certain degree, thereby reducing the amount of free binder, which may permeate through veneer layer, and thereby also reduce the fluid pressure. The fillers may comprise wood particles such as lignocellulosic and/or cellulosic particles. The wood particles may be at least partially bleached.

Controlling the permeation of the sub-layer through the veneer layer may comprise adjusting the thickness of the sub-layer, for example by adjusting the amount of the sub-layer applied. If the sub-layer is applied as a powder, controlling the permeation of the sub-layer through veneer layer may be controlled by adjusting the amount of powder applied for forming the sub-layer. By applying a larger amount of powder for forming the sub-layer, the sub-layer permeates through the veneer layer to an increased extent.

Controlling permeation of the sub-layer through the veneer layer may comprise forming holes and/or cracks in the veneer layer. The holes and/or cracks facilitate the sub-layer to permeate through the veneer layer. Forming holes and cracks reduces resistance for the sub-layer for permeating through the veneer layer. Forming holes, cavities and/or cracks may be performed by brushing prior to applying pressure to the veneer layer and/or the substrate. The holes, cracks and cavities may be pre-existing but enlarged, and/or may be newly formed holes, cracks and cavities.

Controlling permeation of the sub-layer through the veneer layer may comprise controlling a thickness of the veneer layer. The thinner veneer layer, the less distance for the sub-layer to travel until the sub-layer is visible on the top surface of the veneer layer.

Said at least a portion of the sub-layer may permeate through pores of the veneer layer. A veneer is a porous structure, including pores in which the sub-layer may permeate.

Said at least a portion of the sub-layer may permeate through cracks and holes of the veneer layer.

The veneer layer may comprise a wood veneer, a cork veneer, or stone veneer. The veneer layer has a porous structure, and a portion of sub-layer may permeate through the veneer layer. The wood veneer may be cut veneer, sawn veneer, rotary cut veneer, and/or half-round cut veneer.

The sub-layer may comprise a binder.

The sub-layer may comprise a thermosetting binder. The thermosetting binder may be an amino resin such as melamine formaldehyde, urea formaldehyde, phenol formaldehyde, or a combination thereof. The thermosetting binder simultaneously bonds the veneer layer to the sub-layer. When heat and pressure is applied to the sub-layer, the thermosetting binder becomes fluid before cross-linking takes place. The applied heat and pressure results in curing of the thermosetting binder of the sub-layer, simultaneously as bonding the veneer layer to the sub-layer.

The sub-layer may comprise a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof. The thermoplastic binder simultaneously bonds the veneer layer to the sub-layer.

The sub-layer may be substantially formaldehyde free.

The sub-layer may further comprise pigments. Thereby, the veneer layer may be coloured by the parts of the sub-layer penetrating through the veneer layer. The sub-layer may be pigmented to one or several different colours. By using a sub-layer containing different colours, different parts of the veneer layer and/or different veneers may obtain different colours. The pigments may be brought by the flowable binder to an upper part of the veneer layer. The pigments may provide a colour being darker or lighter than the natural colour of the veneer. The pigment may be white, such as TiO2. White pigments, such as TiO2, may be combined with at least partially bleached wood particles, for example, to form a pale staining of the veneer.

The sub-layer may comprise wear resistant particles. Wear resistant particles which are brought by the binder of the sub-layer to an upper part of the veneer layer provide wear resistance to the veneer layer.

The substrate may be a wood-based board, for example, a wood-fibre based board such as MDF or HDF, or plywood. The substrate may be a Wood Plastic Composite (WPC). The substrate may be a mineral composite board. The substrate may be a fibre cement board. The substrate may be magnesium oxide cement board. The substrate may be a ceramic board. The substrate may be a plastic board such as a thermoplastic board.

The substrate may be a sheet such as paper sheet.

The fluid pressure may be uniformly distributed. Thereby, an essentially uniform permeation of the sub-layer through the veneer layer may be obtained, if the veneer layer has an essentially uniform structure. An essentially uniform colouring of the veneer layer may also be obtained, if the veneer layer has an essentially uniform structure.

The fluid pressure may be non-uniformly distributed. By the fluid pressure being non-uniformly distributed, the degree of permeation of the sub-layer may vary of the surface of the veneer and non-uniform pattern may be obtained.

The method may further comprise digital printing a pattern in the sub-layer prior to applying the veneer layer on the sub-layer. The method may further comprise digital printing a pattern on the veneer layer, prior or after pressing.

The veneer layer may be a continuous layer or a discontinuous layer of veneers. The veneer layer may be formed of several veneers pieces. The veneer layer may be formed of several pieces of veneer, forming a patchwork of veneers. The sub-layer may fill the gaps between the veneer pieces.

After pressure has been applied, the veneer layer may comprise embossed portions. A portion of the sub-layer may be more compressed under an embossed portion than under a non-embossed veneer layer portion.

The embossed portions may be naturally occurring after pressing. For wood veneers having a porous structure, such as hard wood (e.g., angiosperm), porous portions of the veneer form embossed portions after pressing, since these portions do not spring back from their compressed state when the pressure is released. These porous portions are filled with the binder of the sub-layer during pressing. Then the binder cures and/or hardens, the binder locks the position of the porous portions in the compressed state. The portions of veneer having high density, i.e. being non-porous, are compressed during pressing but spring back when the pressure is released, thus forming protrusions of the surface layer. The high-density portions do not absorb enough binder from the sub-layer to be locked by the hardened binder after pressing.

For wood veneer having a non-porous structure, such as soft wood (e.g., gymnosperm), the summer wood annual rings (also called late wood annual rings), having high density, are not compressible during pressing. Instead, the summer wood annual rings are pressed into the sub-layer such that the sub-layer is compressed. The summer wood annual rings form embossed portions of the surface layer. The spring wood annual rings (also called early wood annual rings) are compressible during pressing. During pressing, the spring wood annual rings are compressed. Then the pressure is released, the spring wood annual rings spring back, and form protrusions.

The embossed portions of the surface layer may also be formed by pressing by an embossed pressing device, such as an embossed press plate.

The method may further comprise applying a balancing layer on a surface of the substrate being opposite the veneer layer. The balancing layer may be a powder based balancing layer being applied as a powder. The powder based balancing layer may comprise wood particles such as lignocellulosic and/or cellulosic particles and a binder, preferably a thermosetting binder such as an amino resin. The balancing layer may be a resin impregnated paper, preferably impregnated with a thermosetting binder.

A second aspect of the disclosure relates to a veneered element. The veneered element comprises a substrate, a sub-layer arranged on the substrate, and a veneer layer arranged on the sub-layer, wherein at least a portion of the sub-layer is permeated through the veneer layer.

At least a portion of the sub-layer may be visible at the surface of the veneer facing away from the substrate.

The sub-layer may further comprise pigments.

The sub-layer may comprise fillers. The fillers may be particles or fibres, for example wood fibres or particles, or mineral particles or fibres. The wood particles may be lignocellulosic particles and/or cellulosic particles. The wood particles may be at least partially bleached.

The sub-layer may comprise wear resistant particles.

The substrate may be a wood-based board.

The at least a portion of the sub-layer may be permeated through pores of the veneer layer.

The veneer layer may comprise a wood veneer, a cork veneer, or a stone veneer.

The veneer layer may comprise embossed portions. A portion of the sub-layer may be more compressed under an embossed portion than under a non-embossed veneer layer portion.

The embossed portions may be naturally occurring after pressing. For wood veneers having a porous structure, such as hard wood (e.g., angiosperm), porous portions of the veneer form embossed portions after pressing, since these portions do not spring back from their compressed state when the pressure is released. These porous portions are filled with the binder of the sub-layer during pressing. Then the binder cures and/or hardens, the binder locks the position of the porous portions in the compressed state. The portions of veneer having high density, i.e. being non-porous, are compressed during pressing but spring back when the pressure is released, thus forming protrusions of the surface layer. The high-density portions do not absorb enough binder from the sub-layer to be locked by the hardened binder after pressing.

For wood veneer having a non-porous structure, such as soft wood (e.g., gymnosperm), the summer wood annual rings (also called late wood annual rings), having high density, are not compressible during pressing. Instead, the summer wood annual rings are pressed into the sub-layer such that the sub-layer is compressed. The summer wood annual rings form embossed portions of the surface layer. The spring wood annual rings (also called early wood annual rings) are compressible during pressing. During pressing, the spring wood annual rings are compressed. Then the pressure is released, the spring wood annual rings spring back, and form protrusions.

The embossed portions of the surface layer may also be formed by pressing by an embossed pressing device, such as an embossed press plate.

The method may further comprise applying a balancing layer on a surface of the substrate being opposite the veneer layer. The balancing layer may be a powder based balancing layer being applied as a powder. The powder based balancing layer may comprise wood particles such as lignocellulosic and/or cellulosic particles and a binder, preferably a thermosetting binder such as an amino resin. The balancing layer may be a resin impregnated paper, preferably impregnated with a thermosetting binder.

The veneered element according to the second aspect of the disclosure incorporates all the advantages of the method, which previously has been discussed, whereby the previous discussion is applicable also for the veneered element.

According to a third aspect of the disclosure, a method of producing an element is provided. The method comprises
providing a substrate,
applying a sub-layer on a first surface of the substrate,
applying a surface layer having a porous structure on the sub-layer, and
applying pressure to the surface layer and/or the substrate, such that a least a portion of the sub-layer is permeating through the porous structure of the surface layer.

BRIEF DESCRIPTION OF THE DRAWINGS

The disclosure will by way of example be described in more detail with reference to the appended schematic drawings, which show embodiments of the disclosure.

DETAILED DESCRIPTION

Figure 1A:
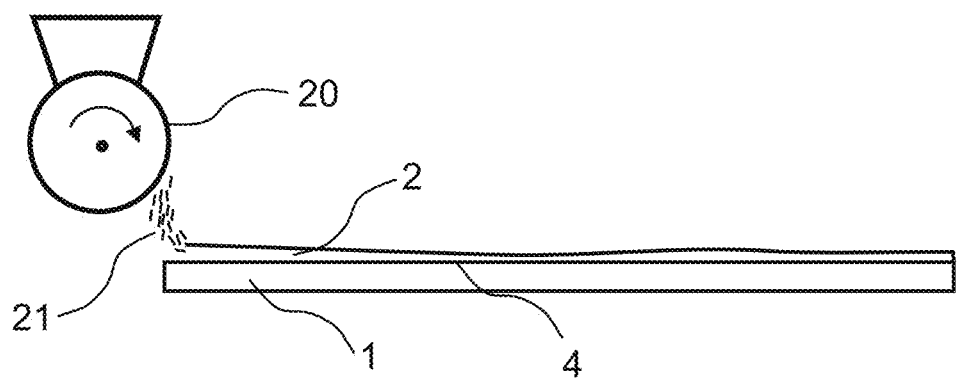
FIGS. 1a-1b illustrates a method of a producing a veneered element according to an embodiment.
Figure 1B:
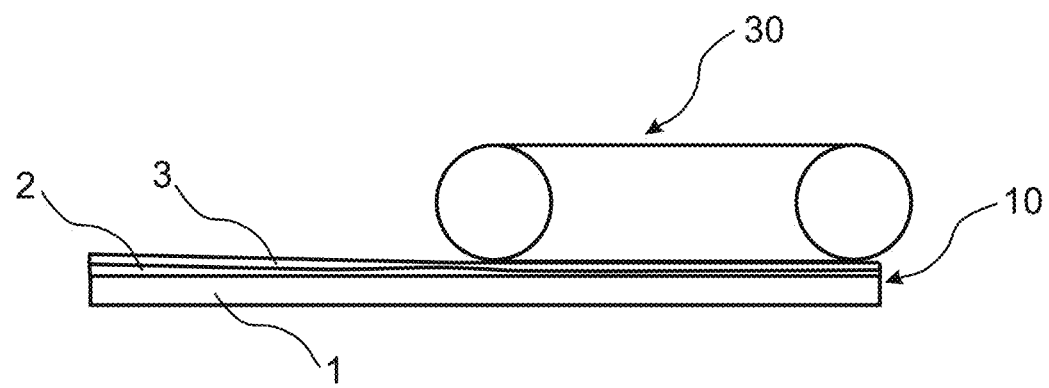
Figure 5:
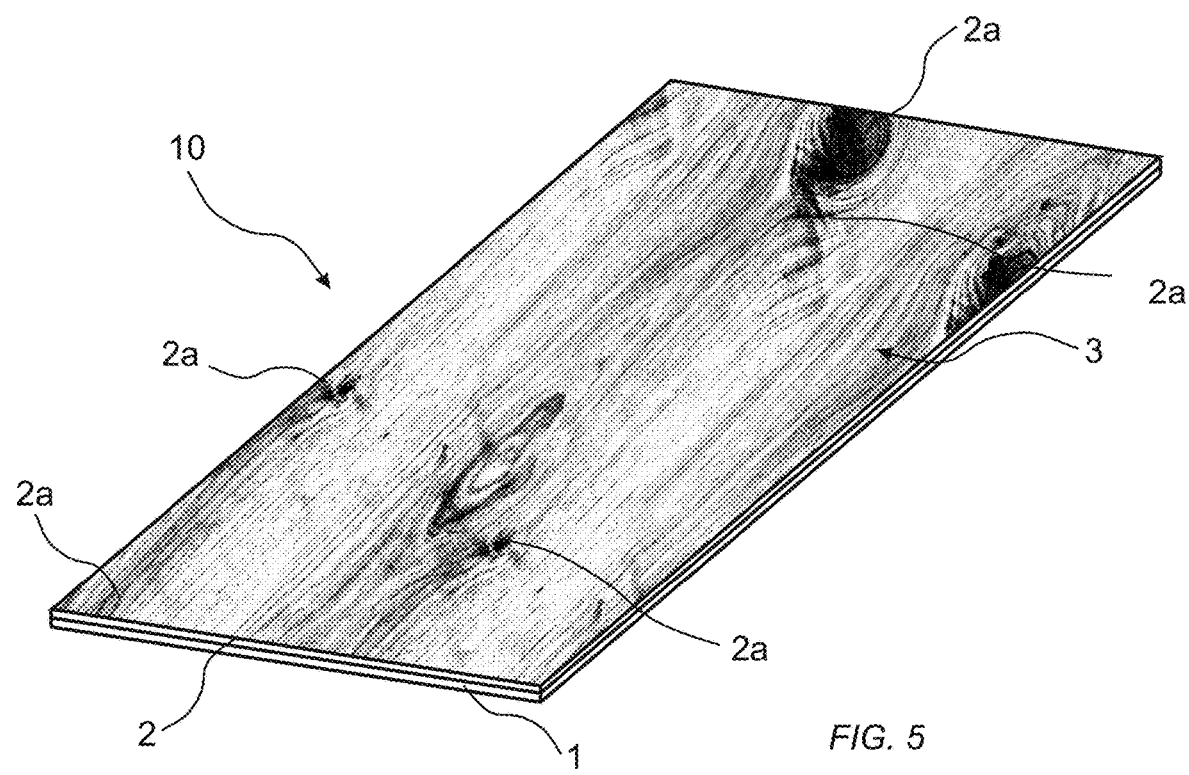
FIG. 5 illustrates an embodiment of a veneered element.

FIGS. 1a-1b show a method of producing a veneered element 10. The veneered element 10 may be a furniture component, a building panel such as a floor panel, a ceiling panel, a wall panel, a door panel, a worktop, skirting boards, mouldings, edging profiles, etc. The method comprises providing a substrate 1. The substrate is preferably a prefabricated substrate, manufactured prior to the method of producing the veneered element 10. The substrate 1 may be a board, for example, a wood-based board as shown in the embodiment shown in FIGS. 1a-3. The wood-based board may be a wood fibre based board such as MDF, HDF, particleboard etc., or a plywood board. In other embodiments, the substrate may be a Wood Plastic Composite (WPC). The substrate may be a mineral composite board. The substrate may be a fibre cement board. The substrate may be magnesium oxide cement board. The substrate may be a ceramic board. The substrate may be a plastic board such as a thermoplastic board. In another embodiment, the substrate 1 may be a carrier such as sheet of paper or non-woven as shown in FIG. 5, or a conveyor.

A sub-layer 2 is applied on a first surface 4 of the substrate 1. In the embodiment shown in FIG. 1a, the sub-layer 2 is applied in powder form 21. The powder 21 adapted to form the sub-layer 2 is applied by scattering, as shown in FIG. 1a. The sub-layer may also be applied as granules. In other embodiments, the sub-layer 2 may be applied as a liquid, as a paste, a sheet, etc. The sub-layer 2 may be applied by roller coating, spraying, etc.

In one embodiment, the sub-layer 2 comprises a sheet impregnated with a thermosetting binder. The sheet may be paper sheet. The sheet may be coloured, and/or the binder solution used to impregnate the sheet may be coloured, such that sheet becomes coloured during impregnation.

The sub-layer 2 comprises a binder. The binder may be a thermosetting binder, a thermoplastic binder, or a combination thereof. The binder may be wood mastic, wood filler or any other type of putty-like paste. The thermosetting binder may be an amino resin such as melamine formaldehyde resin, phenol formaldehyde resin, urea formaldehyde resin, or a combination thereof. Urea formaldehyde resin may be used, alone or in combination with melamine formaldehyde resin, to reduce tension formed by the sub-layer 2 during curing, compared to when melamine formaldehyde resin is used only. The thermoplastic binder may be polyvinyl chloride (PVC), polyethylene (PE), polypropylene (PP), polyurethane (PU), polyvinyl alcohol (PVOH), polyvinyl butyral (PVB), polyvinyl acetate (PVAc), and/or thermoplastic elastomer (TPE), or a combination thereof.

The binder may be in powder form when applied.

The sub-layer 2 may be formed of a mix comprises a binder of the above described type and fillers. The mix may further comprise pigments. The mix may further comprise additives. The mix may further comprise wear and/or scratch resistant particles. As an alternative to a mix, the binder, fillers, pigments, additives and any other component may be applied separately on the substrate 1.

The fillers may be particles or fibres, for example wood fibres or particles, or mineral particles or fibres. The wood particles may be lignocellulosic particles and/or cellulosic particles. The wood particles may be at least partially bleached. The fillers may be rice, straw, corn, jute, linen, flax, cotton, hemp, bamboo, bagasse or sisal particles or fibres. The sub-layer may comprise starch such as maize starch, potato starch, etc.

The fillers may be fillers having sound-absorbing properties such as cork particles and/or barium sulphate (BaSO4). Alternatively, a sound-absorbing layer, for example a cork layer or cork veneer layer, may be arranged as an intermediate layer. The sub-layer is applied on the sound-absorbing layer. The sound-absorbing layer may be arranged on the substrate, or on a sub-layer arranged on the substrate.

The pigments may be darker than the natural colour of the veneer layer, and/or be paler that the natural colour of the veneer layer. The pigments may include white pigments such as TiO2. A pigment such as TiO2 can combined with at least partially bleached wood particles to obtain a white staining of the veneer by the permeation of the sub-layer through the veneer. In one embodiment, a pre-mix is formed by white pigments such as TiO2 and wood particles, preferably at least partially bleached wood particles. The pre-mix is then mixed with remaining wood particles, binder, additives etc.

The additives may be wetting agents, anti-static agents such as carbon black, and heat-conducting additives such as aluminium. Other possible additives are magnetic substances.

The sub-layer 2 may also comprise a foil or a sheet.

Additives such as blowing agents may be included in the sub-layer. The blowing agents may be physical foaming agents such as EXPANCEL(RTM) and/or chemical blowing agents such as AIBN (azoisobutyronitrile) or ADC (azodicarbonamide).

The wear and/or scratch resistant particles may be aluminium oxide particles and/or silica particles.

In one embodiment, the sub-layer 2 consists essentially of the binder and optionally additives, meaning that at least 90% of the sub-layer 2 is the binder and optional additive(s). In one embodiment, the sub-layer 2 is free from any fibres and/or fillers.

The sub-layer 2 may be applied in an amount of 200-600 g/m2, preferably 300-500 g/m2 such as about 400 g/m2. The amount of binder applied for the sub-layer 2 may be 100-300 g/m2, preferably 150-250 g/m2 such as about 200 g/m2. The sub-layer 2 may comprise the binder in an amount of 30-80 wt %, preferably in an amount of 40-60 wt % such as about 50 wt %.

The sub-layer 2 may be pre-pressed prior to applying the veneer layer 3.

A veneer layer 3 is applied on the sub-layer 2. The veneer layer 3 may be a wood veneer, a cork veneer, or a stone veneer. The veneer has a porous structure, thus being permeable. The veneer layer 3 may have a thickness of about 0.2 to 1 mm. The veneer layer 3 may be continuous or non-continuous. The veneer layer 3 may be formed of several veneer pieces. The veneer pieces may be overlapping or non-overlapping. A gap may be formed between the veneer pieces. The gap may be filled by the sub-layer 2 after pressing. The veneer pieces may be applied randomly or forming a pattern. A patchwork of veneer pieces may be formed. The veneer pieces may be arranged in a pattern such as a herringbone pattern, Dutch pattern etc., with several veneer pieces arranged on one substrate 1. The veneer pieces may also be arranged such that the veneer pieces, or the gap between the veneer pieces, form a template.

The sub-layer 2 may have a uniform colour, different shades, or different portions of the sub-layer may have different colours. A multi-coloured veneer layer 3 may be formed by colouring different portions of the sub-layer 2 in different colours. If the veneer layer 3 is formed by several veneer pieces, a first set of veneer pieces may be differently coloured than a second set of veneer pieces. Alternatively, each veneer piece may be differently coloured by the sub-layer being differently coloured under each veneer piece.

In one embodiment, a digital print may be printed in the sub-layer 2, preferably by an ink jet printer. The different colours of the print permeate through the veneer layer 3 such that the colouring of the sub-layer 2 is transferred into the surface of the veneer layer 3. The colouring and/or pattern of the sub-layer 2 may also be obtained by a binder and print technique (BAP), for example as described in WO2014/017972. In one embodiment, a digital print is printed on the veneer layer 3.

More than one veneer layer 3 may be arranged on a core. In one embodiment, a first veneer layer may be arranged on the substrate 1, a sub-layer 2 of the above described type is arranged on the first veneer layer, and a second veneer layer is arranged on the sub-layer 2. A groove may be formed, for example after pressing, in the second veneer layer and in the sub-layer 2 such as the first veneer layer is visible. A gap may also be arranged between different portions of the second veneer layer such that the sub-layer and/or the first veneer layer is visible. The veneer layer may also comprise veneer pieces arranged crosswise.

As shown in FIG. 1b, when the veneer layer 3 is arranged on the sub-layer 2, pressure is applied to the veneer layer 3 and/or the substrate 1 such that a fluid pressure is formed in the sub-layer 2. The pressure may be applied by continuous press 30 or in a discontinuous press (not shown). Preferably, heat is also applied.

When sufficient pressure is applied, the sub-layer 2 permeates through pores, cracks and holes in the veneer layer 3. At least a portion of the sub-layer 2 permeates fully through the veneer layer 3 such that said at least a portion of the sub-layer 2 becomes visible on the veneer layer 3. Said at least a portion of the sub-layer, which permeates or transfers through the veneer layer 3, comprises at least one component of the sub-layer 2. The matter of the sub-layer 2 permeating through the veneer layer 3 may be one or several of the components of the sub-layer 2. For example, the binder of the sub-layer 2 may permeate through the veneer layer. The binder may bring any pigments of the sub-layer 2 to the upper surface of the veneer layer 3 when melted during pressing.

The sub-layer 2 may be in fluid form or powder form when applied. The binder of the sub-layer 2, for example a thermosetting or thermoplastic binder, may be applied as a powder or in fluid form as a dispersion, solution or suspension. If the binder is applied in powder form when applied, the binder melts when applying heat exceeding the melting point of the binder at the pressure applied. Thereby, the binder is in liquid form. By applying a pressure, a fluid pressure of the sub-layer 2 is formed. Thereby, the binder in liquid form may permeate the veneer layer 3. If a thermosetting binder is used, the thermosetting binder is firstly dominated by a melting process up to a first temperature, thereafter the thermosetting binder is dominating by a cross-linking process.

By controlling the degree of permeation of the sub-layer 2 through the veneer layer 3, the design of the veneered element 10 can be controlled. The design of the veneer can be changed by the sub-layer 2 at least partly permeating the veneer layer 3 and thus being visible at the surface of the veneer layer 3. If the veneer layer 3 comprises cracks, cavities and other irregularities, the fluid pressure required to permeate completely through the veneer layer 3 is decreased, such that portions of the sub-layer 2 easily permeates through the veneer layer 3 and fills the crack or holes. Thereby, putty can be avoided or at least reduced. By including pigments in the sub-layer 2, the design of the veneer can be changed further.

For some designs, a large degree of permeation may be desired, and for other designs, less, or varying, permeation may be desired. For example, if a uniform colouring of the veneer such as glazing, lazuring or staining is desired, a uniform fluid pressure is preferred. Preferably, the veneer layer 3 has a uniform thickness and structure. If a varying permeation is desired, resulting in varying pattern of the veneer, a varying fluid pressure is preferred. The veneer layer 3 may have a varying structure including cracks and cavities. The thickness of the veneer layer 3 can also be controlled in order to control the permeation of the sub-layer 2 and thereby the design of the veneer layer 3. The thinner the veneer layer 3 is, the larger amount of the sub-layer 2 permeates through the veneer layer 3.

Controlling the design of the veneered element 10 by controlling the permeation of the sub-layer 2 can be made in several ways. The fluid pressure may be controlled and adjusted. The fluid pressure may be varying over the surface of the veneer layer 3. The fluid pressure can be increased if a large degree of permeation of the sub-layer 2 is desired. The fluid pressure can be decreased if less permeation of the sub-layer 2 is desired.

The fluid pressure can be controlled in several ways. The fluid pressure can be controlled by controlling the pressure applied to the substrate 2 and/or veneer layer 3. The temperature applied may have influence on the permeation, for example by changing the viscosity of the sub-layer 2.

The fluid pressure may also be controlled by generating a gas pressure in the sub-layer 2. By generating a gas pressure inside the sub-layer 2, the fluid pressure increases. The gas pressure may be generated by including chemical and/or physical blowing agents in the sub-layer. The chemical and/or physical blowing agents increase the fluid pressure when activated.

The fluid pressure of the sub-layer 2 may also be controlled by adjusting the concentration of binder in the sub-layer 2. By increasing the concentration of the binder of the sub-layer 2, the more material of the sub-layer 2 may permeate through the veneer layer 3. The part of the sub-layer 2 that flows when heat and pressure is applied increases, and thereby a larger part of the sub-layer 2 may permeate through the veneer layer 3. Furthermore, the type of binder may be adjusted. By increasing the amount of a thermosetting binder in the sub-layer 2, the part of the sub-layer 2 being flowable when heat and pressure is applied increases, and thereby the fluid pressure.

The fluid pressure of the sub-layer 2 may also be controlled by adjusting the type of binder in the sub-layer 2. By using different types of binders, the fluid pressure of the sub-layer 2 and thereby the permeation can be altered. A rapidly curing binder forms less permeation of the sub-layer 2 through the veneer layer.

The fluid pressure may also be controlled by adjusting the moisture content of the sub-layer. The higher moisture content of the sub-layer, the more steam is formed when applying heat and pressure, thereby increasing the fluid pressure, and consequently, permeation of the sub-layer 2 through the veneer layer 3. Contrary, by decreasing the moisture content of the sub-layer 2 before pressing, for example, by drying the sub-layer 2, the less steam is formed during pressing.

Permeation of the sub-layer 2 through the veneer layer 3 may also be controlled by including fillers in the sub-layer. The fillers reduce permeation of the sub-layer by reducing the flowing of the binder. Some fillers, such as wood particles and other organic fillers, absorb the binder to some extent such that the remaining binder that is free to permeate through the veneer layer 3 is reduced. The fluid pressure is thereby also reduced.

Permeation of the sub-layer 2 through the veneer layer 3 may also be controlled by adjusting the thickness of the sub-layer 2, for example by adjusting the amount of sub-layer applied. If the sub-layer 2 is applied as a powder, the amount of powder applied can be adjusted in order to achieve the desired permeation of the sub-layer 2 through the veneer layer 3. The thicker sub-layer, i.e. the larger amount of sub-layer applied, the more the sub-layer 2 permeates through the veneer layer 3.

Permeation of the sub-layer 2 through the veneer layer 3 may also be controlled by forming holes or cracks through the veneer layer 3. By forming, or enlarging existing, holes and cracks, the sub-layer 2 permeates easily through the veneer layer 3. Controlling permeation of the sub-layer 2 through the veneer layer 3 may be performed by forming, or enlarging existing cavities, holes and/or cracks, preferably by brushing.

By adjusting and controlling these parameters, permeation of the sub-layer 2 through the veneer layer 3 can be controlled such that a desired look of the veneer surface is obtained, for example as shown in FIGS. 2-5.

In an embodiment, a produced building panel may be 6-25 mm thick, preferably 8-15 mm thick after pressing, while the core may be 5-22 mm thick, preferably 7-14 mm thick. The sub-layer may be 0.1-2 mm thick after pressing.

Furthermore, a protective layer (not shown) may be applied to the veneer layer 3. The protective layer may be a coating such as one or several lacquer layers. The coating may be an acrylate or methacrylate coating such as polyurethane coating. The coating may comprise wear and/or scratch resistant particles. The protective layer may be an overlay paper comprising wear resistant particles. The protective layer may be a powder overlay, as described in WO2011/129755, comprising processed wood fibres, a binder and wear resistant particles applied as mix on the veneer surface. If the protective layer comprises or is an overlay paper or a powder overlay, the protective layer is preferably applied before the step of applying heat and pressure. Thereby, the protective layer is cured and attached to the veneer layer in the same step as attaching the veneer layer to the sub-layer and to the substrate.

The veneered element 10 may further be treated in different ways, for example brushed, oiled, lacquered, waxed, etc.

A protective coating (not shown) may also be applied to the veneer layer 3 prior to pressing. In one embodiment, a wax powder is applied, for example, scattered, on the upper surface of the veneer layer, facing away from the substrate 1, prior to pressing. During pressing, the wax powder forms a protective coating of the veneered element 10.

In one embodiment, a primer is applied on the upper surface of the veneer layer, facing away from the substrate 1, prior to pressing. The primer may be a print primer, a primer for preparing the veneer layer 3 for lacquering, etc.

A protective foil may also be applied on the veneer layer 3 prior or after pressing. The protective foil may be thermoplastic foil such as PU or PVC foil.

Figure 2:
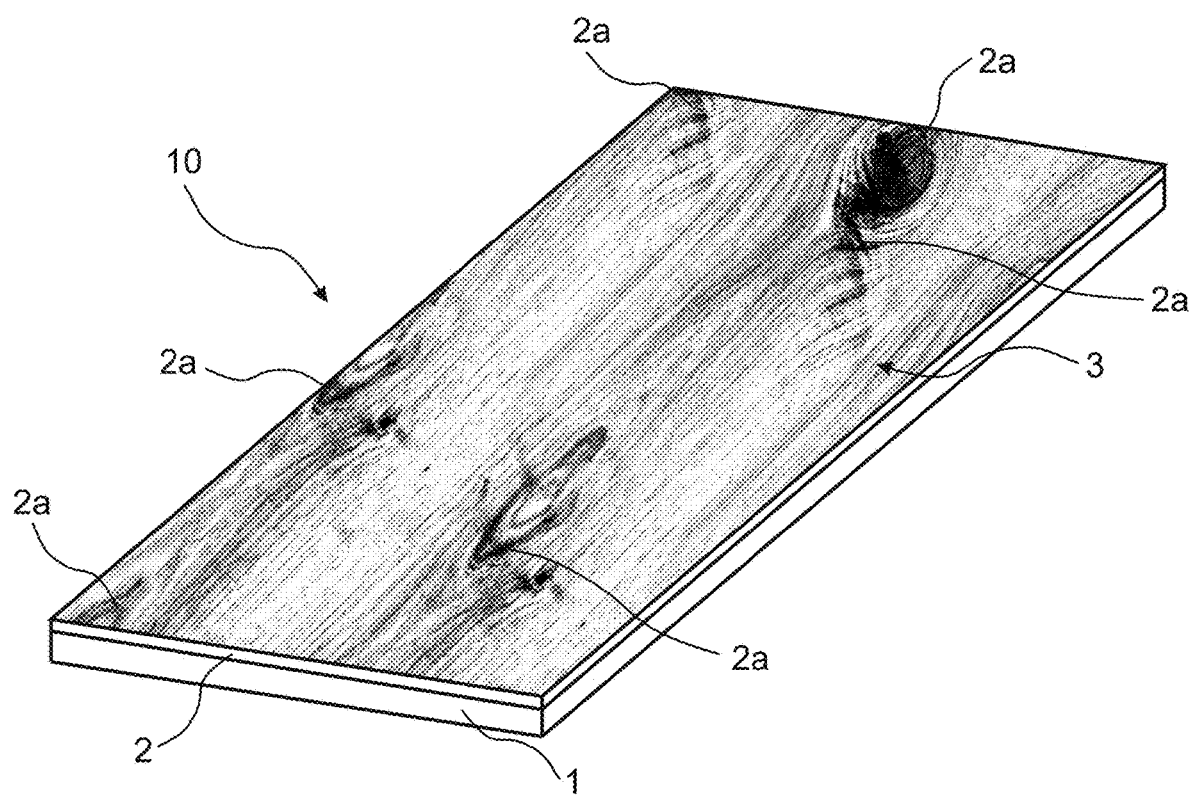
FIG. 2 illustrates an embodiment of a veneered element.

In the embodiment in FIG. 2, the substrate 1 comprises a wood-based board such as plywood, HDF, MDF, particleboard etc. In this embodiment the veneered element 10 may be a building panel or a furniture component. If the veneered element 10 is a floor or wall panel, the floor or wall panel may be provided with a mechanical locking system for joining with an adjacent floor or wall panel. If the veneered element 10 is a furniture component for a drawer, shelf or other furniture, the furniture may be provided with a mechanical locking system for joining with another part of the drawer, shelf or furniture component.

The veneered element 10 may be provided with decorative grooves or bevels. The decorative grooves or bevels may be extending into the sub-layer 2 such that the sub-layer 2 is visible form the top surface of the veneered element. The decorative groove or bevel may be arranged adjacent an edge of the veneered element provided with the mechanical locking system. By providing a decorative groove extending into the sub-layer 2, a ship-decking appearance may be obtained.

In the embodiment in FIG. 2, the sub-layer 2 has permeated through the veneer layer 3 in some portions of the veneer layer 3 where the resistance of the veneer has been lower, for example as in cracks, holes and cavities of the veneer layer, but to a lower degree through other parts of the veneer layer 3. Portions 2a of the sub-layer 2 are visible on the surface of the veneer layer 3 as shown in FIG. 2. The permeation of the sub-layer 2 forms an irregular design of the veneer.

Figure 3:
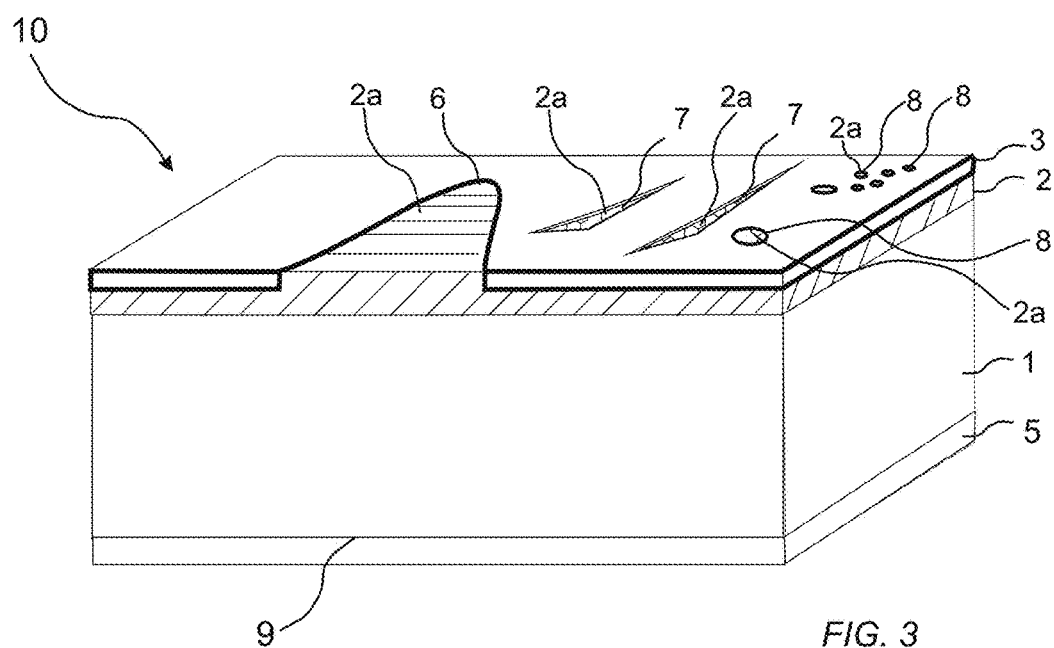
FIG. 3 illustrates a cross-section of a veneered element.

FIG. 3 shows a cross-section of the veneered element 10 in more detail. FIG. 3 illustrates in more detail how portions 2a of the sub-layer 2 have permeated through the veneer layer 3 such that the portions 2a of the sub-layer 2 are visible from an exposed surface of the veneer layer 3. FIG. 3 illustrates that the sub-layer 2 has permeated through the veneer layer 3 and filled holes 6 of veneer such that portions 2a of the sub-layer 2 are visible through the veneer layer 3. The hole 6 may, as in FIG. 3, be a knot. FIG. 3 also illustrates that the sub-layer 2 has permeated through the veneer layer 3 and filled cracks 7 in the veneer such that portions 2a of the veneer layer 3 are visible from the upper surface of the veneer layer 3. Furthermore, FIG. 3 shows that portions 2a of the sub-layer 2 have permeated through pores 8 of the veneer layer 3 such that portions 2a of the sub-layer 2 are visible on the upper surface of the veneer layer 3. In the embodiment shown in FIG. 3, the substrate 1 comprises a wood based board such as plywood, HDF, MDF, particleboard etc. The veneered element 10 is also provided with a balancing layer 5 arranged on a second surface 9 of the substrate 1, opposite the sub-layer 2. The balancing layer 5 may be a powder based balancing layer being applied as a powder. The powder based balancing layer may comprise wood particles such as lignocellulosic and/or cellulosic particles and a binder, preferably a thermosetting binder such as an amino resin. The balancing layer may be a resin impregnated paper, preferably impregnated with a thermosetting binder.

Figure 4:
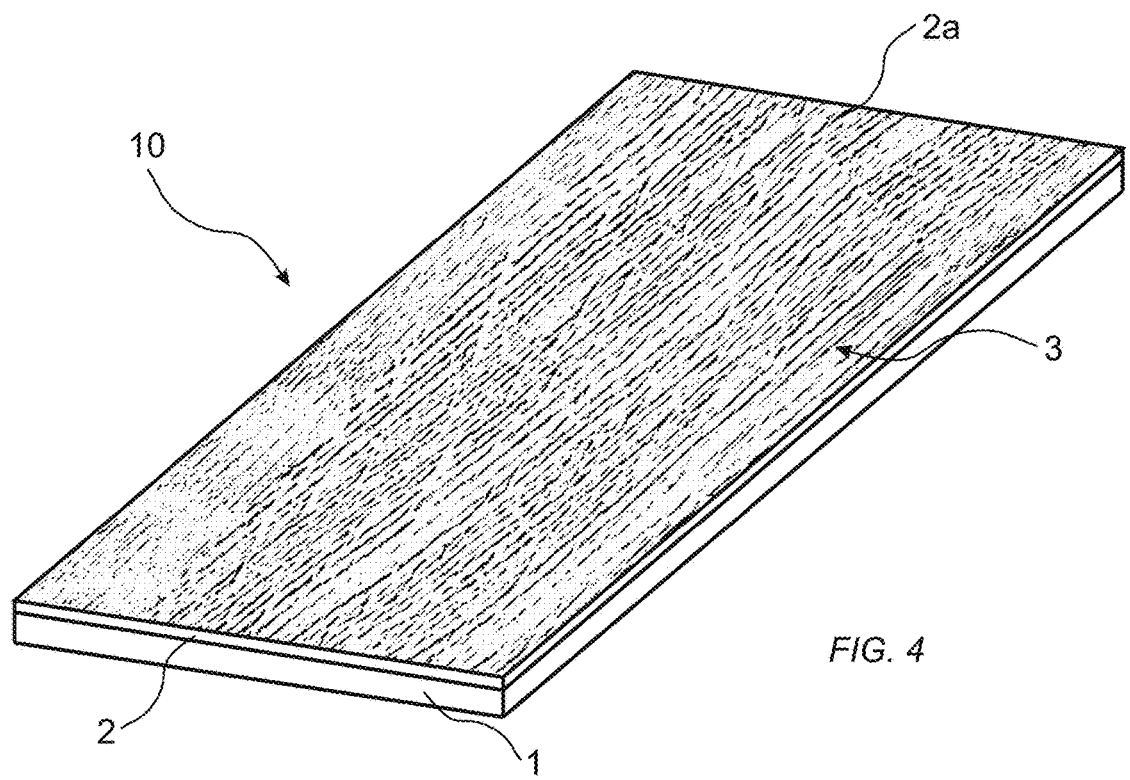
FIG. 4 illustrates an embodiment of a veneered element.

In FIG. 4, also showing a veneered element 10 of the above described type wherein the substrate 1 comprising a wood based board such as plywood, HDF, MDF, particleboard etc. Also in this embodiment the veneered element 10 may be a building panel or a furniture component, and may be provided with a mechanical locking system. However, in this embodiment, compared to the embodiment shown in FIG. 2, permeation of the sub-layer 2 is more uniform through the veneer layer 3 such that a more regular design of the veneer layer 3 is obtained. This may be achieved by applying a uniform pressure, and by providing a veneer layer 3 having a uniform porous structure and/or uniform thickness.

FIG. 5 shows an embodiment of the veneered element 10 of the above described type wherein the substrate 1 comprises a paper or a sheet. The substrate 1 forms a carrier for the veneer layer 3 and the sub-layer 2. The veneered element 10 according to this embodiment may be bendable and/or flexible. Thereby, post-forming of the veneered element 10 is possible. The veneered element 10 may be adhered to another element in a later operation. The veneered element 10 may form a surface of, for example, a furniture component. In one embodiment, the substrate is a conveyor, and the veneered element 10 is removed from the conveyor after heat and pressure have been applied.

It is contemplated that there are numerous modifications of the embodiments described herein, which are still within the scope of the invention as defined by the appended claims.

It is contemplated that the sub-layer may not directly contact the substrate, but an intermediate layer arranged between the substrate and the sub-layer may be provided.

It is also contemplated that the building panel may be provided with a second veneer layer (not shown) of the above described type applied in the same manner as described above. A sub-layer of the above described type is applied on a second surface of the substrate of the above described type. The second surface of the core faces away from the veneer layer described above with reference to FIGS. 1-4. In this embodiment, the veneer layer described above with reference to FIGS. 1-4 is considered as a first veneer layer, and the second veneer layer is arranged oppositely the first veneer layer. A design of the second veneer layer is controlled by determining level of permeation of the sub-layer through the second veneer layer as described above with reference to FIGS. 1-5.

EXAMPLES

Example 1

400 g/m2 of a powder mixture, comprising 40 wt-% wood fibres, 10 wt-% aluminium oxide (Alodur ZWSK 180-ST), 49.5 wt-% melamine formaldehyde resin (Kauramin 773) and 0.5 wt-% of carbon black (Printex 60), was scattered on a 10.0 mm HDF board for forming a sub-layer. The powder layer forming the sub-layer was sprayed with 20 g/m2 of an aqueous solution of a release agent (PAT-660). A 0.6 mm oak veneer layer was positioned on the sub-layer prior to pressing the assembly in a short cycle press for 30 seconds at 40 bar with a press plate temperature of 160° C. The resulting product was a veneered HDF having pores and cracks in the veneer layer filled with the cured powder mixture of the sub-layer.

Example 2

800 g/m2 of a powder mixture, comprising of 40 wt-% wood fibres, 10 wt-% aluminium oxide (Alodur ZWSK 180-ST), 49.5 wt-% melamine formaldehyde resin (Kauramin 773) and 0.5 wt-% of carbon black (Printex 60), was scattered on a 10.0 mm HDF board for forming a sub-layer. The powder layer forming the sub-layer was sprayed with 20 g/m2 of an aqueous solution of a release agent (PAT-660). A 0.6 mm oak veneer was positioned on the sub-layer prior to pressing the assembly in a short cycle press for 30 seconds at 40 bar with a press plate temperature of 160° C. The resulting product was a veneered HDF having cracks and an increased amount of pores in the veneer layer filled with the cured powder mixture of the sub-layer in comparison with the product of example 1.

Example 3

400 g/m2 of a powder mixture, comprising 17.5 wt-% wood fibres, 17.5 wt-% mineral fibres 10 wt-% aluminium oxide (Alodur ZWSK 180-ST), 52.5 wt-% melamine formaldehyde resin (Kauramin 773) and 0.5 wt-% of carbon black (Printex 60), was scattered on a 10.0 mm HDF board for forming a sub-layer. The powder layer forming the sub-layer was sprayed with 20 g/m2 of an aqueous solution of a release agent (PAT-660). A 0.6 mm oak veneer was positioned on the sub-layer prior to pressing the assembly in a short cycle press for 30 seconds at 40 bar with a press plate temperature of 160° C. The resulting product was a veneered HDF having cracks and a decreased amount of pores in the veneer layer filled with the cured powder mixture of the sub-layer in comparison with the product of example 1.

Example 4

400 g/m2 of a powder mixture, comprising 10 wt-% aluminium oxide (Alodur ZWSK 180-ST), 89.5 wt-% melamine formaldehyde resin (Kauramin 773) and 0.5 wt-% of carbon black (Printex 60), was scattered on a 10.0 mm HDF board for forming a sub-layer. The powder layer forming the sub-layer was sprayed with 20 g/m2 of an aqueous solution of a release agent (PAT-660). A 0.6 mm oak veneer was positioned on the sub-layer prior to pressing the assembly in a short cycle press for 30 seconds at 40 bar with a press plate temperature of 160° C. The resulting product was a veneered HDF having cracks and an increased amount of pores in the veneer filled with the cured powder mixture of the sub-layer in comparison with the product of the example 1.

Example 5

400 g/m2 of a powder mixture, comprising 40 wt-% wood fibres, 10 wt-% aluminium oxide (Alodur ZWSK 180-ST), 49.5 wt-% thermoplastic binder (Vinnapas 5010 N) and 0.5 wt-% of carbon black (Printex 60), was scattered on a 10.0 mm HDF board for forming a sub-layer. The powder layer forming the sub-layer was sprayed with 20 g/m2 of an aqueous solution of a release agent (PAT-660). A 0.6 mm oak veneer was positioned on the sub-layer prior to pressing the assembly in a short cycle press for 30 seconds at 40 bar with a press plate temperature of 160° C. The resulting product was a veneered HDF having a decreased amount of pores and cracks in the veneer layer filled with the cured powder mixture compared to the product of example 1.

Example 6

400 g/m2 of a liquid mixture, comprising 45 wt-% water, 10 wt-% aluminium oxide (Alodur ZWSK 180-ST), 44.5 wt-% melamine formaldehyde resin (Kauramin 773) and 0.5 wt-% of carbon black (Printex 60), was applied on a 10.0 mm HDF board for forming a sub-layer. A 0.6 mm oak veneer was positioned on the liquid layer forming the sub-layer prior to pressing the assembly in a short cycle press for 30 seconds at 40 bar with a press plate temperature of 160° C. The resulting product was a veneered HDF having pores and cracks in the veneer layer filled with the cured mixture.

The invention claimed is:

1. A method of producing a veneered element, comprising:
    providing a substrate,
    applying a sub-layer on a surface of the substrate, the sub-layer being applied as a dry powder, the sub-layer comprising a binder and wood fibers,
    applying a veneer on the sub-layer, the veneer being one of a wood veneer, a cork veneer, and a stone veneer, the veneer comprising a hole extending from the top surface through the bottom surface so that the sub-layer is visible through the hole of the veneer,
    applying heat and pressure to the veneer and/or the substrate, the heat and pressure causing the sub-layer to melt and causing at least a portion of the sub-layer to permeate partially through the veneer to become visible at an upper surface of the veneer,
    wherein the method further comprises
        controlling a decorative design of the veneer by determining a level of partial permeation of the sub-layer through the veneer.

2. The method according to claim 1 wherein the substrate is a wood-based board.

3. The method according to claim 1, wherein the veneer layer comprises a wood veneer.

4. The method according to claim 1, wherein the veneer layer comprises a cork veneer.

5. The method according to claim 1, wherein the veneer layer comprises a stone veneer.

6. The method according to claim 1, wherein the binder is a thermosetting binder.

7. The method according to claim 1, wherein the binder is a thermoplastic binder.

8. The method according to claim 1, wherein after pressure has been applied, the veneer layer comprises embossed portions, wherein a portion of the sub-layer is more compressed under an embossed portion than under a non-embossed surface portion.

* * * * *